Figure 1:
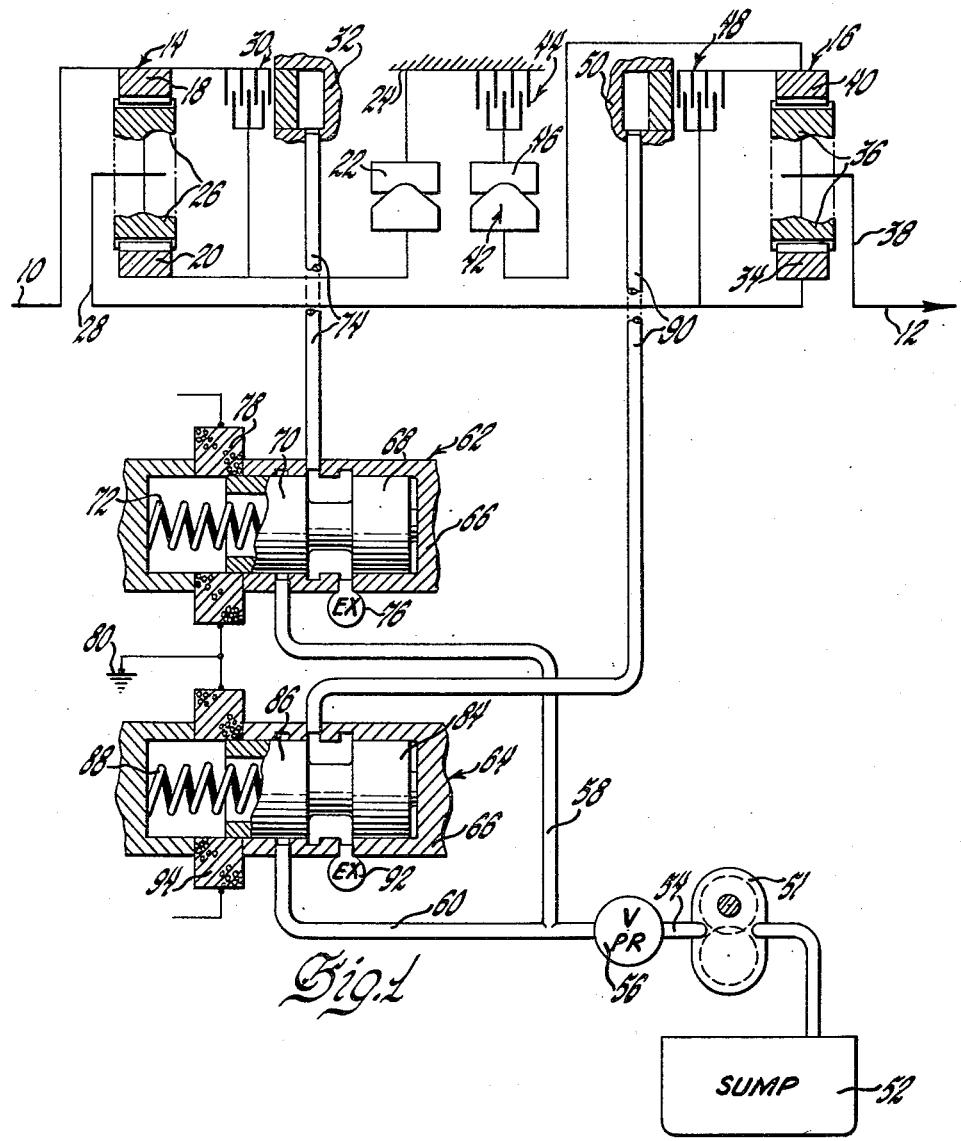

INVENTORS
John B. Brennan &
John S. Force
BY
W. C. Middleton
ATTORNEY

Dec. 18, 1962  J. B. BRENNAN ETAL  3,068,715
TRANSMISSION
Filed March 27, 1958  2 Sheets-Sheet 2

TO ENGINE
INTAKE MANIFOLD

INVENTORS
John B. Brennan &
John B. Force
BY
W. C. Middleton
ATTORNEY

United States Patent Office 3,068,715
Patented Dec. 18, 1962

3,068,715
TRANSMISSION
John B. Brennan, Flint, and John B. Force, Bancroft, Mich., assignors to General Motors Corporation, Detroit, Mich., a corporation of Delaware
Filed Mar. 27, 1958, Ser. No. 724,323
36 Claims. (Cl. 74—472)

This invention relates to transmissions and particularly to electrical control systems of a character adapted, although not exclusively, for use with automatic transmissions.

In automatic transmissions of the multiple step ratio type, efforts are continuously being made to produce smooth and relatively imperceptible shifts, i.e., transitions from one speed ratio to another. Exemplary of this is a plural planetary gear set transmission wherein brakes and clutches condition the different gear sets for the changes in speed ratio. These changes in ratio must take place properly according to some predetermined pattern or scheme, determined not only by the driver's desires but also by several other factors among which are engine speed, engine torque load, vehicle speed, and the torque characteristics of the engine, as well as those of the clutches and brakes. Necessarily, when a hydraulic medium is used exclusively, the control system becomes very complex with any requirement for multiple shifts creating further complications. Moreover, in a hydraulic system compensation must be made for certain inherent characteristics such as those of the fluid utilized.

With the foregoing problems in mind, the invention contemplates, in a broad sense, a simplified electrical control system for producing speed ratio changes in a vehicle transmission according to a chosen scheme or pattern. With the system, any selected shift pattern can be easily duplicated by minor changes in the system components. Moreover, the invention proposes utilizing both vehicle speed and engine torque load as primary factors in establishing the shift pattern.

By this proposed electrical system, the invention provides driver control of not only increasing speed ratio changes, i.e., upshifts, but also decreasing speed ratio changes (downshifts). Such control allows the driver to vary the shift points to meet varying driving conditions.

Another objective of the invention is the provision of a relay control circuit operated by a composite signal voltage representative of engine torque load and vehicle speed for controlling the transmission ratio changing mechanism through a power relay.

More specifically, the invention affords a control system that through a relay control circuit and an associated power relay control hydraulically operated ratio changing mechanism for a transmission. The relay control circuit includes a switching relay, the energization of which, by an appropriate source of voltage, is controlled by signal voltage operated control devices within the circuit. The signal voltage, which is proportional to vehicle speed, is modified by upshift and downshift control circuits that are alternately connectible to the relay control circuit thereby controlling both upshifts and downshifts of the transmission.

In carrying out the invention according to one form thereof, a combined electrical and hydraulic system is utilized to control ratio changing mechanisms for a planetary gear type transmission. These ratio changing mechanisms are operated hydraulically by shift valve trains which, in turn, are operated by power relays. A signal voltage for the system is developed by a generator driven by the transmission output shaft so as to be proportional to vehicle speed, and is then modified according to engine torque load by upshift and downshift control circuits alternately connectible with a relay control circuit. The relay control circuit comprises a switching relay the energization of which, by a relatively constant source of voltage is controlled by a semi-conductor power device, in turn, controlled by a semi-conductor drive device in accordance with variations in the signal voltage. When the signal voltage attains a predetermined value, the drive device will be cut off and thereby cut off the power device. The switching relay becomes de-energized whereupon the switching relay causes the power relay to operate the ratio changing mechanism and condition the transmission for a speed ratio change. If an upshift occurs, then the downshift control circuit is connected by the switching relay to the relay circuit so as to prepare the transmission for a downshift, should such be desired. On the other hand, if a downshift results, the switching relay will connect the upshift control circuit to the relay circuit so that an upshift can be subsequently produced, when wanted.

Figure 2:
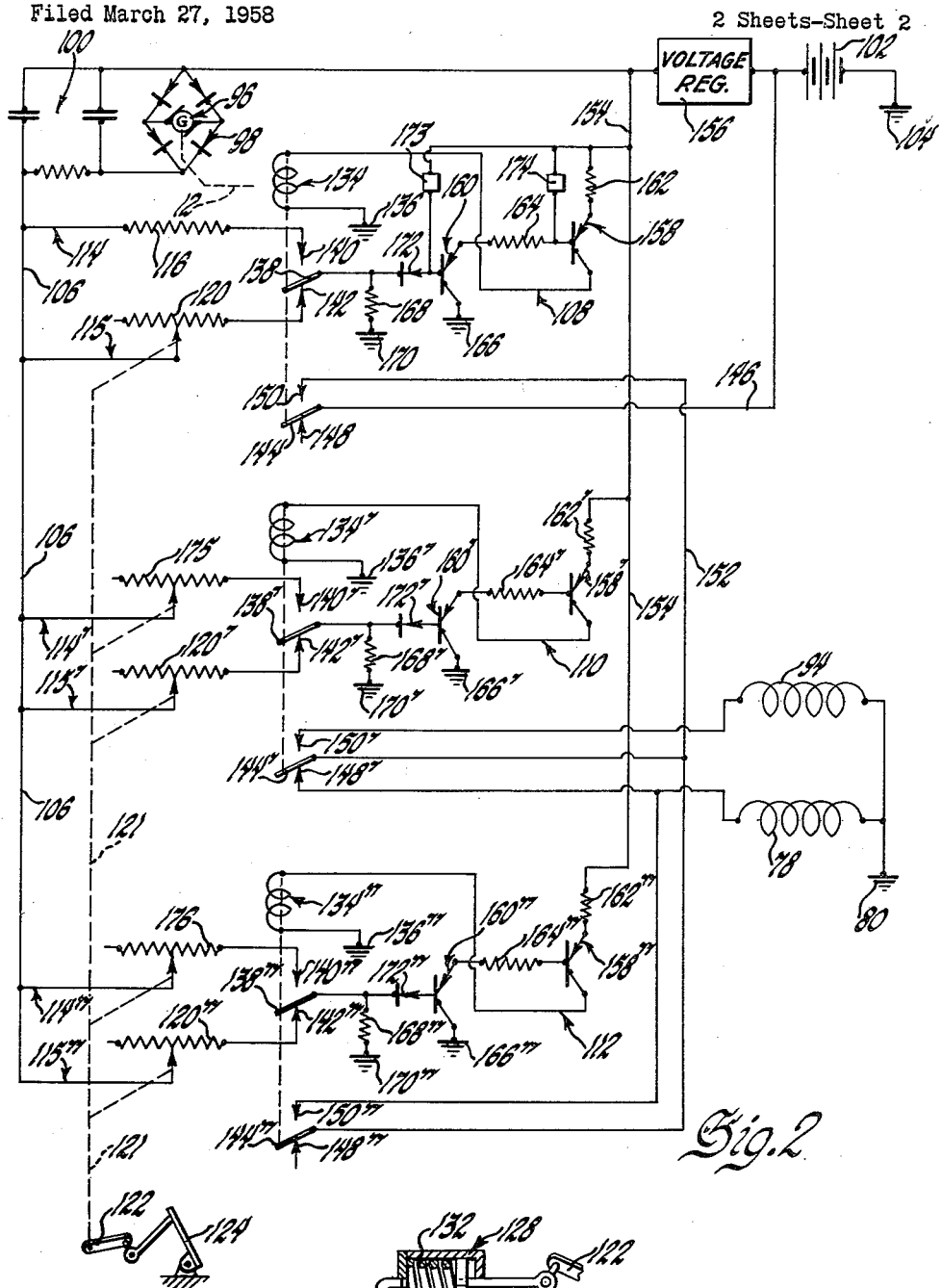
Figure 2A:
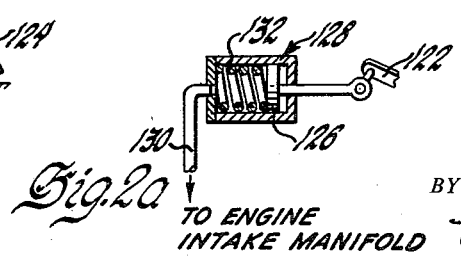

The foregoing and other advantages of the invention will be apparent from the following description and from the accompanying drawings in which:

FIGURE 1 shows schematically a transmission and the hydraulic controls therefor;
FIGURE 2 illustrates an electrical network for controlling the transmission hydraulic system; and
FIGURE 2a shows a modification of the FIGURE 2 throttle control.

Referring to the drawings and particularly FIGURE 1, the transmission illustrated comprises a driving shaft 10 which may appropriately be clutched to a vehicle engine, not shown, and a driven shaft 12 suitably drive connected to the vehicle wheels. A front planetary gear unit 14 and a rear planetary gear unit 16 interconnect the shafts 10 and 12 and cooperate to provide four forward drive ratios therebetween.

The front planetary gear unit 14 has an input ring gear 18 connected to the driving shaft 10 and a reaction sun gear 20 restrained from reverse rotation by a one-way device which is grounded at 24. The one-way device 22 may be of any known construction utilizing sprags, rollers, or the like, to prevent relative rotation between two members in one direction and allow relative rotation therebetween in the opposite direction. Intermeshing with the ring and sun gears 18 and 20 are a series of planet pinions 26 journaled on a carrier 28 extending to the rear planetary gear unit 16. With the sun gear 20 prevented from reverse rotation, the forwardly rotated ring gear 18 will revolve the carrier 28 in the same forward direction but at a reduced speed. Direct drive through the gear unit 14 is afforded by a clutch 30 positioned between the ring and sun gears 18 and 20. The clutch 30 may be of any conventional structure such as the multi-disk type illustrated and engaged by a hydraulically operated servo motor 32. When the clutch 30 is engaged, the ring and sun gears 18 and 20 are caused to revolve together and as a result, the unit 14 locks up with the carrier 28 being rotated at the same speed as the input ring gear 18.

As mentioned, the front unit carrier 28 transfers drive to the rear planetary gear unit 16. This is accomplished through a connection between the front unit carrier 28 and an input sun gear 34 for the rear unit 16. A series of planet pinions 36 are journaled on a rear unit carrier 38, in turn, connected to the driven shaft 12. Pinions 36 intermesh with sun gear 34 and a reaction ring gear 40 which is prevented from reverse rotation by the combined action of a one-way device 42 and a neutral brake 44 that holds an outer race 46 for the one-way device. The one-way device 42 is similar to the front unit one-way device 22 and likewise allows the reaction ring gear 40 to revolve forwardly unrestrained. Consequently, when the input sun gear 34 is driven forwardly, neutral brake 44 and the one-way device 42 will prevent the reaction ring gear 40 from rotating backwards and cause the output carrier 38 to drive the driven shaft 12 forwardly at a reduced speed. A clutch 48 similar to the front unit clutch 30 is interposed between the sun and ring gears 34 and 40 and is operated by a hydraulic servo motor 50. When the clutch 48 is engaged by the motor 50, direct drive is established between the input sun gear 34 and the output carrier 38, since the sun and ring gears 34 and 40 are tied together preventing relative rotation of the gears.

Neutral and four forward drive ratios through the transmission are obtained as follows: In Neutral the front and rear unit clutches 30 and 48 and the neutral brake 44 are all disengaged. Disengaging the neutral brake 44 removes reaction for the rear unit ring gear 40 and insures that the rear unit 16 cannot transfer drive from the front unit 14 to the driven shaft 12. The front unit 14, because the sun gear 20 is prevented from revolving backwards by the front unit one-way device 22, will transfer drive to the rear unit 16 when the driving shaft 10 is revolved. Therefore, it is essential that the drive connection in the rear unit 16 be interrupted which the neutral brake 44 accomplishes. To initiate drive in the first speed available, the neutral brake 44 is engaged. Hence, both the front unit 14 and the rear unit 16 are conditioned for reduced drive as explained and the driven shaft 12 will be driven at a speed determined by the combined ratios afforded by the front and rear units 14 and 16. In second speed the front unit clutch 30 is engaged locking up the front unit 14 whereupon the driven shaft 12 is revolved at a rate determined entirely by the ratio provided in the rear unit 16. For third speed a double transition occurs inasmuch as the front clutch 30 is disengaged and the rear clutch 48 is engaged. Therefore, the rear unit 16 is locked up and the front unit 14 is conditioned for reduced drive again. The driven shaft 12 then will be driven at a speed determined by the front unit 14. In fourth speed the front clutch 30 is re-engaged and both the front and rear units combine to provide a direct drive between the driving and driven shafts 10 and 12.

Pressure fluid for operating the front and rear unit servo motors 32 and 50 is derived from a pump 51 preferably driven at engine speed. The pump 51 draws fluid from a sump 52 and discharges into a main supply line 54 in which is located a conventional pressure regulating valve 56. The regulating valve 56 operates in a known manner to maintain the pressure in the system substantially constant at some predetermined amount. Communicating with the main supply passage 54 are branch lines 58 and 60 leading, respectively, to a front unit shift valve 62 and a rear unit shift valve 64, both of which are housed within bores in a valve body 66.

The front unit shift valve 62 is of the spool type comprising spaced lands 68 and 70 and is biased to the depicted position by a spring 72. In this position, the lands 68 and 70 establish communication between a front unit serve supply line 74 and an exhaust port 76, thus draining the front unit servo motor 32 and disengaging the front unit clutch 30. To move the valve 62 to the left, a relay 78 is utilized, the winding of which is grounded at 80. When the relay 78 is energized as will be explained, the valve 62 is drawn to the left so as to re-position the lands 68 and 70. In the new position communication between branch supply line 58 and the front unit servo supply line 74 is permitted by the lands 68 and 70 and the exhaust port 76 is closed by land 68. With the valve 62 in this latter position, the front unit clutch 30 will be engaged by pressure fluid supplied to the servo motor 32.

As illustrated, the rear unit shift valve 64 is similar to the front unit shift valve 62 and includes spaced lands 84 and 86. Also, the valve 64 is biased to the viewed position by a spring 88 in which position a rear unit servo supply line 90 is opened to an exhaust port 92 by the lands 84 and 86 and the clutch 48 is maintained disengaged. The valve 64 is shifted to the left by a relay 94 also grounded at 80 and operated as will be described. When shifted to the left the lands 84 and 86 open branch supply line 60 to the rear unit servo supply line 90 and the land 84 closes exhaust port 92. With lines 60 and 90 communicating in this manner, the rear unit clutch 48 is engaged by the hydraulic actuation of the rear unit servo 50.

The electrical network in FIGURE 2 develops a signal voltage reflective of both vehicle speed and the torque load on the engine, which signal voltage is utilized to control the front and rear unit power relays 78 and 94 so as to produce changes in speed ratio according to a predetermined scheme or pattern. This is accomplished in part by a tachometer generator, indicated generally at 96, which, preferably, is of the A.C. brushless type and is driven by the shaft 12. The generator 96 is combined with a full wave bridge rectifier, shown generally at 98, and a filter 100 and is interposed between a battery 102, such as a vehicle battery, the negative terminal of which is grounded at 104, and a main supply line 106. By this arrangement a D.C. signal voltage, proportional to vehicle speed, is supplied to line 106.

This signal voltage is then supplied to various upshift and downshift control circuits leading to a first to second speed relay control circuit 108, a second to third speed relay control circuit 110, and a third to fourth speed relay control circuit 112. Referring first to the first to second speed relay control circuit 108, the signal voltage is fed thereto from the line 106, at appropriate times, to be explained, either by a second to first speed downshift or decreasing speed ratio control circuit 114 or by a first to second speed upshift or increasing speed ratio control circuit 115, as will be explained. The second to first speed control circuit 114 has a fixed resistance 116 and therefore, modifies the signal voltage transferred thereby so as to produce a fixed second to first speed downshift, as will be described in the operational summary. The first to second speed control circuit 115 modifies the signal voltage transferred therethrough in accordance with the engine torque load and hence the upshifts will vary accordingly. To do this a variable resistor 120 is placed in the first to second speed circuit 115 and is varied through an arm 121 and an attached crank 122, either with changes in throttle position or pressure variations in the engine intake manifold (not shown). Variation with throttle position may be accomplished by a connection of the crank 122 with an accelerator pedal 124 so that as the accelerator 124 is depressed the throttle will open and the variable resistor 120 will be moved to increase the resistance in the circuit 115, thus reducing the signal voltage. By utilizing this throttle position aspect, the driver's desires are sensed. Moreover, an increased throttle opening reflects an increase in the torque demand on the engine.

For the manifold pressure installation, the crank 122 may be connected to a piston 126 slidable within the cylinder of a servo motor 128. Then one end of the motor 128 may be connected through a conduit 130 to the intake manifold of the engine. As is well known, manifold pressure increases, i.e., becomes less negative or approaches atmospheric pressure, with an increase in the load on the engine, such as that occurring when the accelerator pedal 124 is depressed, and when the torque load on the engine is reduced, the manifold pressure decreases, i.e., becomes more negative. With a light load on the engine, e.g., that existing when the engine is idling with the accelerator pedal 124 released, the decreased pressure in the line 130, being more negative, will overcome the bias from a spring 132 and draw the piston 126 to the left. This will move the variable resistor 120 towards the decreasing resistance position and produce a greater signal voltage in circuit 115. On the other hand, with an increase in engine load and a resultant increase in manifold pressure, the piston 126 will be urged to the right by the spring 132 and through the crank 122 will move the variable resistor 120 towards the increased resistance position, thus decreasing the signal voltage.

The first to second speed relay control circuit includes a switching relay, denoted generally at 134, which is grounded at 136. Preferably, the switching relay 134 is of the double-throw double-pole type and comprises a movable contact 138 engageable either with a fixed contact 140 in the second to first speed control circuit 114 or a fixed contact 142 in the first to second speed control circuit 115 and a movable contact 144 connected by a battery supply line 146 to the positive terminal of the battery 102. The movable contact 144 is engageable with either a fixed open contact 148 or a fixed contact 150 connected to an outlet line 152. Switching relay 134 is supplied current by a constant voltage supply line 154, the voltage in which is maintained relatively constant by an appropriate voltage regulator 156. The current supplied to the switching relay 134, for effecting an energization thereof, is controlled by a semi-conductor output device 158, which, in turn, is controlled by a semi-conductor drive device 160. Preferably, both of the devices 158 and 160 are transistors of the PNP kind, each having emitter, collector, and base or control electrodes. However, NPN type transistors could be used with appropriate polarity changes, if desired. As illustrated, the output transistor 158 has the emitter electrode connected through an emitter resistor 162 to the constant voltage supply line 154, the collector electrode connected to the switching relay 134, and the base electrode joined through a resistor 164 to the emitter electrode of the drive transistor 160. In addition to the emitter electrode, the drive transistor 160 has the collector electrode grounded at 166 and the base electrode connected to the movable contact 138 of the switching relay 134. The bias of the drive transistor 160 is set by bias resistor 168 grounded at 170. Interposed between the bias resistor 168 and the base electrode of the drive transistor 160 is an isolating diode 172, the function of which is to insure, at times, when the signal voltage is excessive, as at high vehicle speed, and the drive transistor 160 is cut off, that a reversal of current flow cannot occur should this signal voltage dominate the voltage in the constant voltage supply line 154. Otherwise, this reversal of current flow could fire the drive transistor 160 and cause the power transistor 158 to become conductive at an inopportune time.

In some installations the voltage regulator 156 may not be required if the battery or source of voltage does not fluctuate too much. However, with a vehicle battery there is a range of variation which, if too broad, can upset the calibration of the shift points.

Because at increased temperatures of operation current flow can result, which could conceivably interfere with the calibration of the relay control circuit 108, suitable thermistors may be provided in each relay control circuit, e.g., at 173 and 174 in circuit 108 to eliminate this temperature effect. If the temperature range of operation is not great enough to be influenced by temperature then, of course, the thermistors may be eliminated.

The other relay control circuit, namely, the second to third speed relay control circuit 110 and the third to fourth speed relay control circuit 112, have the same components, although they may be of different values. Therefore, for simplification like parts in each circuit have been assigned the same numerals as that the first to second speed relay control circuit 108 except that a prime (') and a double prime ('') have been added to those, respectively, in relay control circuits 110 and 112. This also applies to the upshift and downshift control circuits to each of the relay control circuits 110 and 112 except for the third to second speed control circuit 114' which has in place of the fixed resistor 116 a variable resistor 175 and the fourth to third speed control circuit which has a variable resistor 176. These variable resistors 175 and 176 are arranged to operate as the first to second speed control circuit variable resistor 120, i.e., as the accelerator pedal 124 is depressed, the resistance is increased. The values of resistors 175 and 176 and also of resistor 116 will be determined by a downshift pattern or scheme wanted. For a given throttle setting, the upshift and downshift points will be different so as to avoid objectionable "hunting," i.e., upshifting and downshifting with only slight changes in vehicle speed and also to take advantage of the torque characteristics of a certain engine. In other words, and using downshift and upshift circuits 114' and 115' as exemplary, the voltage drops across resistors 175 and 120' will be different with the same torque load on the engine and the same input signal voltage from the generator 96. Therefore, the downshift and upshift points will be different and will be determined by the circuit in effect.

To explain the operation of the control system, assume first that the transmission is conditioned for Neutral. In this condition, as previously explained, the neutral brake 44 is disengaged by an appropriate control (not shown).

Vehicle movement can be commenced by engaging the neutral brake 44, whereupon the transmission will be conditioned for the first speed ratio, assuming the electrical and hydraulic systems are as depicted and the several transistors for each relay control circuit are conductive. Hence, the appropriate switching relays are energized so as to maintain the movable contacts in these depicted positions.

As the vehicle speed increases, the signal voltage transferred from the main supply line 106 through the first to second speed control circuit 115 to the first to second speed relay control circuit 108 becomes sufficiently positive to cause the drive transistor 160 to be cut off, the cut-off point being determined by bias resistor 168. When the drive transistor 160 becomes nonconductive, it will cause the power transistor 158 to likewise be nonconductive and switching relay 134 will be de-energized. When the switching relay 134 is de-energized, the movable contacts 138 and 144, respectively, engage fixed contacts 140 and 150. The second to first speed control circuit 114 is therefore prepared for a downshift, while the battery supply line 146 is connected through the movable contact 144 and fixed contact 150 to the outlet 152. Consequently, battery voltage is supplied by the outlet line 152 to the front unit relay 78 via the movable contact 144', fixed contact 148', both for the second to third speed circuit switching relay 134'. The front unit relay 78 is thereupon energized causing the front unit shift valve 62 to move to the upshifted position and permit delivery of pressure fluid to the front unit clutch 30. The front unit clutch 30 becomes engaged and the transmission is set for second speed drive.

With a further increase in vehicle speed, the signal voltage increases accordingly and is transferred by the second to third speed control circuit 115' to the second to third speed relay control circuit 110. The drive transistor 160' is cut off, which renders the output transistor 158' non-conductive, and the switching relay 134' will drop out. In the de-energized position of switching relay 134', the movable contact 131' thereof, will engage the fixed contact 140' and prepare the third to second speed control circuit 114' for a downshift. Also, the movable contact 144' will engage the fixed contact 150', whereupon the front unit relay 78 will be cut off from the battery supply line 146 and the rear unit relay 94 will be connected to the outlet line 152. With the front unit relay 78 de-energized, the front unit shift valve 62 will move to the downshifted position viewed, disengaging the front unit clutch 30, while the rear unit relay 94, being now energized, will move the rear unit shift valve 64 to the upshifted position and supply fluid pressure to the rear unit clutch 48. The rear unit clutch 48 is thereby engaged, and with the front unit clutch disengaged the transmission is prepared for third speed.

A still further increase in vehicle speed will produce a signal voltage in the third to fourth speed control circuit 115″ of a value that will cause the drive transistor 160″ in the third to fourth relay control circuit 112 to become nonconductive. This will shut off the power transistor 158″ and de-energize the switching relay 134″. The movable contacts 138″ and 144″, therefore, will be moved upwardly to respectively engage the fixed contacts 140″ and 150″. The fourth to third speed control circuit 114″ is, in a manner as the previously described downshift control circuits 114 and 114′, prepared for a fourth to third speed downshift. Since the movable contact 144″ is connected to the fixed contact 150″ for the first to second speed relay control circuit switching relay 134 and the fixed contact 150″ is connected to the front unit relay 78, battery voltage will be supplied to the front unit relay 78. As described before, when the relay 78 is energized the front unit shift valve 62 is moved to the upshifted position engaging the front unit clutch 30. Now, both the front and rear unit clutches 30 and 48 are engaged and the transmission is conditioned for fourth speed or direct drive.

To commence the decreasing speed ratio or downshift cycle, the vehicle speed is decreased until the signal voltage in the fourth to third speed control circuit 114″ is below a predetermined amount, whereupon the third to fourth relay control circuit 112 again becomes operative. As a result, the drive transistor 160″ fires and causes the power transistor 158″ to again become conductive. The switching relay 134″ is, therefore, energized and shifts the movable contacts 138″ and 144″ to the illustrated positions de-energizing the front unit relay 78. The front clutch 30 is disengaged and third speed is re-established.

Likewise, a further decrease in the vehicle speed will decrease the signal voltage until the drive transistor 160′ in the second to third speed relay control circuit 110 becomes again conductive. Drive transistor 160′ will fire power transistor 158′ and the switching relay 134′ will become energized moving the movable contacts 138′ and 144′ to the positions shown. In these positions the front unit relay 78 is energized and the rear unit relay 94 de-energized, whereupon the front clutch 30 will engage and the rear clutch 48 disengage to negotiate the downshift to second speed.

The final downshift, i.e., the second to first speed shift occurs when the vehicle slows down to a point where the generated signal voltage in the second to first speed control circuit 114 will cause the first to second speed relay control circuit drive transistor 160 to fire and cause the power transistor 158 to become also conductive. The switching relay 134 is then energized and the movable contacts 138 and 144 are moved downwardly to set up the first to second speed control circuit 115 and disconnect the front unit relay 78 from the battery 102. With the relay 78 de-energized the clutch 30 will be disengaged and both the front and rear units 14 and 16 of the transmission will be conditioned for the lowest reduction drive and establish first speed.

During the upshifts and downshifts, the signal voltage is modified in accordance with engine torque load, as explained, this being accomplished either by the accelerator pedal 124 or the manifold connected servo motor 128. Consequently, by modifying the signal voltage, the point at which an upshift or downshift occurs, is likewise changed with the exception of the second to first speed control circuit 114, which has a fixed resistor 116 and therefore, will always downshift at the same speed. If, during a change to a higher speed ratio, the accelerator pedal is fully depressed, the resistance in the upshift control circuits will be accordingly increased either by the accelerator pedal 124 directly or through the agency of servo motor 128. This will prevent the signal voltage from increasing too rapidly, thus delaying the upshift. In the opposite sense with the vehicle decreasing in speed, and the transmission preparing for a downshift, a sudden depression of the accelerator pedal 124 will by the arrangement either directly or because of an increase in manifold pressure increase the resistance in the downshift control circuits so that the reduction in the signal voltage is increased, thereby forcing the downshift. Of course, by having separate upshift and downshift circuits, each can be conditioned for optimum operation so that upshifts and corresponding downshifts occur at different speeds but at the proper time.

From the foregoing, it will be seen that a very simplified hydraulic control system is operated by an electrical network, which may be easily calibrated to duplicate any desired shift pattern, i.e., a pattern of desired upshifts and downshifts. The electrical network demonstrates modes of compensating for all of the major factors influencing the operation of any transmission control system and avoids many of the inherent deficiencies in any hydraulic system. Moreover, the electrical network utilizes components such as transistors for longer life, accuracy and stability.

The invention is to be limited only by the following claims.

We claim:

1. In a transmission control system for a vehicle, the combination comprising ratio changing means for conditioning the transmission for changes in speed ratio, a power relay for operating the ratio changing means, generating means for developing a signal voltage corresponding to vehicle speed, signal voltage modifying means connected to the signal voltage generating means, the signal voltage modifying means including an upshift control circuit altering the signal voltage according to one scheme when the speed ratios are increasing so that upshifts occur at predetermined points and a downshift control circuit altering the signal voltage according to another scheme when the speed ratios are decreasing so that downshifts occur at different predetermined points, and a relay control circuit connectible with the signal voltage modifying means so as to control the power relay and thereby cause the ratio changing means to condition the transmission for increasing and decreasing speed ratios in accordance with changes in the signal voltage produced by the signal voltage modifying means as determined by whether the speed ratio is increasing or decreasing.

2. In a transmission control system for an engine driven vehicle, the combination comprising ratio changing means for conditioning the transmission for changes in speed ratio, a power relay for operating the ratio changing means, generating means for developing a signal voltage corresponding in magnitude to vehicle speed, the signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the signal voltage modifying means also including means for varying the signal voltage with changes in engine torque load, and a relay control circuit arranged to be alternately connectible with the signal voltage modifying means so as to control the power relay and thereby cause the ratio changing means to condition the transmission for increasing and decreasing speed ratios in accordance with changes in the signal voltage produced, respectively, by the increasing and decreasing speed ratio signal voltage modifying means.

3. In a transmission control system for an engine driven vehicle, the combination comprising ratio changing means for conditioning the transmission for changes in speed ratio, a power relay for operating the ratio changing means, generating means for developing a signal voltage corresponding to vehicle speed, the signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the signal voltage modifying means also including means for varying the signal voltage with changes in engine torque load, a relay control circuit arranged to be alternately connectible with one of the signal voltage modifying means so as to control the power relay and thereby cause the ratio changing means to condition the transmission for increasing and decreasing speed ratios in accordance with changes in the signal voltage produced, respectively, by the increasing and decreasing speed ratio signal voltage modifying means, and means in the control system for compensating for changes in temperature.

4. In a transmission control system for a throttle controlled engine driven vehicle, the combination comprising ratio changing means for conditioning the transmission for changes in speed ratio, a power relay for operating the ratio changing means, generating means for developing a signal voltage corresponding to vehicle speed, the signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the signal voltage modifying means also including means for varying the signal voltage with changes in throttle position, and a relay control circuit arranged to be alternately connectible with one of the signal voltage modifying means so as to control the power relay and thereby cause the ratio changing means to condition the transmission for increasing and decreasing speed ratios in accordance with changes in the signal voltage produced, respectively, by the increasing and decreasing speed ratio signal voltage modifying means.

5. In a transmission control system for an engine driven vehicle, the combination comprising ratio changing means for conditioning the transmission for changes in speed ratio, a power relay for operating the ratio changing means, generating means for developing a signal voltage corresponding to vehicle speed, the signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the signal voltage modifying means also including means for varying the signal voltage with changes in engine torque load, a supply of voltage, and a relay control circuit arranged to be alternately connectible with one of the signal voltage modifying means so as to control the energization of the power relay from the supply of voltage and thereby cause the ratio changing means to condition the transmission for increasing and decreasing speed ratios in accordance with changes in the signal voltage produced, respectively, by the increasing and decreasing speed ratio signal voltage modifying means.

6. In a transmission control system for an engine driven vehicle, the combination comprising ratio changing means for conditioning the transmission for changes in speed ratio, a power relay for operating the ratio changing means, generating means for developing a signal voltage corresponding to vehicle speed, the signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the signal voltage modifying means also including means for varying the signal voltage with changes in engine torque load, a supply of voltage, and a relay control circuit arranged to be alternately connectible with one of the signal voltage modifying means, the relay control circuit including a switching relay responsive to changes in the signal voltage for controlling the energization of the switching relay from the supply voltage so as to cause the ratio changing means to condition the transmission for increasing and decreasing speed ratios in accordance with changes in the signal voltage produced, respectively, by the increasing and decreasing speed ratio signal voltage modifying means.

7. In a transmission control system for an engine driven vehicle, the combination comprising ratio changing means for conditioning the transmission for changes in speed ratio, a power relay for operating the ratio changing means, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the control means including means for varying the signal voltage with changes in engine torque load, a supply of voltage, and a relay control circuit arranged to be alternately connectible with one of the signal voltage modifying means, the relay control circuit including a switching relay and a power device responsive to changes in the signal voltage for controlling the energization of the switching relay from the supply of voltage, the switching relay controlling the energization of the power relay from the supply of voltage so as to cause the ratio changing means to condition the transmission for increasing and decreasing speed ratios in accordance with changes in the signal voltage produced, respectively, by the increasing and decreasing speed ratio signal voltage modifying means.

8. In a transmission control system for an engine driven vehicle, the combination comprising ratio changing means for conditioning the transmission for changes in speed ratio, a power relay for operating the ratio changing means, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the control means including means for varying the signal voltage with changes in engine torque load, a supply of voltage, and a relay control circuit arranged to be alternately connectible with one of the signal voltage modifying means, the relay control circuit including a switching relay, a power device for controlling the energization of the switching relay from the supply of voltage, and a drive device responsive to changes in the signal voltage for controlling the power device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

9. In a transmission control system for an engine driven vehicle, the combination comprising ratio changing means for conditioning the transmission for changes in speed ratio, a power relay for operating the ratio changing means, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the control means including means for varying the signal voltage with changes in engine torque load, a supply of voltage, and a relay control circuit including a switching relay, a power device for controlling the energization of the switching relay from the supply of voltage, a drive device responsive to changes in the signal voltage for controlling the power device, and switching contacts arranged to be operated by the switching relay for alternately connecting one of the signal voltage modifying means to the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

10. In a transmission control system for an engine driven vehicle, the combination comprising ratio changing means for conditioning the transmission for changes in speed ratio, a power relay for operating the ratio changing means, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the control means including means for varying the signal voltage with changes in engine torque load, a supply of voltage, and a relay control circuit arranged to be alternately connectible with one of the signal voltage modifying means, the relay control circuit including a switching relay, a power device for controlling the energization of the switching relay from the supply of voltage, a drive device responsive to changes in the signal voltage for controlling the power device, and means for isolating the signal voltage to the drive device from the supply of voltage, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

11. In a transmisison control system for an engine driven vehicle, the combination comprising ratio changing means for conditioning the transmission for changes in speed ratio, a power relay for operating the ratio changing means, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal volage according to another scheme when the speed ratios are decreasing so that downshifts occur at different predetermined points, one of the control means including means for varying the signal voltage with changes in engine torque load, a supply of voltage, and a relay control circuit arranged to be alternately connectible with one of the signal voltage modifying means, the relay control circuit including a switching relay, a power device responsive to changes in the signal voltage for controlling the energization of the switching relay from the supply of voltage, and means for isolating the signal voltage to the power device from the supply of voltage, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

12. In a transmission control system for an engine driven vehicle, the combination comprising ratio changing means for conditioning the transmission for changes in speed ratio, a power relay for operating the ratio changing means, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the control means including means for varying the signal voltage with changes in engine torque load, a supply of voltage, and a relay control circuit arranged to be alternately connectible with one of the signal voltage modifying means, the relay control circuit including a switching relay, a power device for controlling the energization of the switching relay from the supply of voltage, a drive device responsive to changes in the signal voltage for controlling the power device, means for isolating the signal voltage to the drive device from the supply of voltage, and means in the relay control circuit for compensating for changes in temperature, the switching relay controlling the energization of the power relay from the supply voltage so as to cause the ratio changing means to condition the transmisison for increasing and decreasing speed ratios in accordance with changes in the signal voltage produced, respectively, by the increasing and decreasing speed ratio signal voltage modifying means.

13. In a transmission control system for an engine driven vehicle, the combination comprising ratio changing means for conditioning the transmission for changes in speed ratio, a power relay for operating the ratio changing means, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the control means including means for varying the signal voltage with changes in engine torque load, a supply of voltage, a relay control circuit arranged to be alternately connectible with one of the signal voltage modifying means, the relay control circuit including a switching relay, a power device for controlling the energization of the switching relay from the supply of voltage, a drive device responsive to changes in the signal voltage for controlling the power device, and a voltage regulating means disposed between the power device and the supply of voltage so as to supply a relatively constant voltage thereto, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

14. In a transmission control system for an engine driven vehicle, the combination comprising ratio changing means for conditioning the transmission for changes in speed ratio, a power relay for operating the ratio changing means, generating means for developing a signal voltage corresponding to vehicle speed, an increasing and a decreasing speed ratio signal voltage modifying means connected to the signal voltage generating means, one of the signal voltage modifying means including means for varying the signal voltage with changes in engine torque load, a supply of voltage, and a relay control circuit arranged to be alternately connectible with one of the signal voltage modifying means, the relay control circuit including a switching relay, a power device for controlling the energization of the switching relay from the supply of voltage, a drive device responsive to changes in the signal voltage for controlling the power device, and a bias resistor for the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

15. In a transmission control system for an engine driven vehicle, the combination comprising ratio changing means for conditioning the transmission for changes in speed ratio, a power relay for operating the ratio changing means, generating means for developing a signal voltage corresponding to vehicle speed, an increasing and a decreasing speed ratio signal voltage modifying means connected to the signal voltage generating means, one of the signal voltage modifying means including means for varying the signal voltage with changes in engine torque load, a supply of voltage, and a relay control circuit including a switching relay, a power device for controlling the energization of the switching relay from the supply of voltage, a voltage regulating means disposed between the power device and the supply of voltage so as to supply a relatively constant voltage thereto, a drive device responsive to changes in the signal voltage for controlling the power device, a bias resistor for the drive device, means for isolating the signal voltage to the drive device from the supply of voltage, and switching contacts arranged to be operated by the switching relay for alternately connecting one of the signal voltage modifying means to the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

16. In a transmission control system for an engine driven vehicle, the combination comprising ratio changing means for conditioning the transmission for changes in speed ratio, a power relay for operating the ratio changing means, generating means for developing a signal voltage corresponding to vehicle speed, an increasing and a decreasing speed ratio signal voltage modifying means connected to the signal voltage generating means, one of the signal voltage modifying means including means for varying the signal voltage with changes in engine torque load, a supply of voltage, and a relay control circuit arranged to be alternately connectible with one of the signal voltage modifying means, the relay control circuit including a switching relay, a semi-conductor power device for controlling the energization of the switching relay from the supply of voltage, and a semi-conductor drive device responsive to changes in the signal voltage for controlling the power device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

17. In a transmission control system for a vehicle propelled by an engine having an intake manifold, the combination comprising ratio changing means for conditioning the transmission for changes in speed ratio, a power relay for operating the ratio changing means, generating means for developing a signal voltage corresponding to vehicle speed, increasing and decreasing speed ratio control circuits connected to the signal voltage generating means, one of the speed ratio control circuits including means for varying the signal voltage with changes in pressure in the engine intake manifold, a supply of voltage, and a relay control circuit including a switching relay, a power device for controlling the energization of the switching relay from the supply of voltage, a drive device responsive to changes in the signal voltage for controlling the power device, and switching contacts arranged to be operated by the switching relay for alternately connecting one of the speed ratio control circuits to the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

18. In a transmission control system for a throttle controlled engine driven vehicle, the combination comprising ratio changing means for conditioning the transmission for changes in speed ratio, a power relay for operating the ratio changing means, generating means for developing a signal voltage corresponding to vehicle speed, increasing and decreasing speed ratio control circuits connected to the signal voltage generating means, one of the speed ratio circuits including means for varying the signal voltage with changes in throttle position, a supply of voltage, and a relay control circuit including a switching relay, a semi-conductor power device for controlling the energization of the switching relay from the supply of voltage, a semi-conductor drive device responsive to changes in the signal voltage for controlling the power device, switching contacts arranged to be operated by the switching relay for alternately connecting one of the speed ratio control circuits to the drive device, and a bias resistor for the input of the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

19. In a transmission control system for an engine driven vehicle, the combination comprising ratio changing means for conditioning the transmission for changes is speed ratio, a power relay for operating the ratio changing means, generating, means for developing a signal voltage corresponding to vehicle speed, increasing and decreasing speed ratio control circuits connected to the signal voltage generating means, one of the speed ratio circuits including means for varying the signal voltage with changes in engine torque load, a supply of voltage, and a relay control circuit including a switching relay, a semi-conductor power device for controlling the energization of the switching relay from the supply of voltage, a semi-conductor drive device responsive to changes in the signal voltage for controlling the power device, switching contacts arranged to be operated by the switching relay for alternately connecting one of the speed ratio control circuits to the drive device, a bias resistor for the input of the drive device and means for isolating the signal voltage to the drive device from the supply of voltage, the switching relay controlling the energization to the power relay from the supply voltage so as to cause the ratio changing means to condition the transmission for increasing and decreasing speed ratios in accordance with changes in the signal voltage produced, respectively, by the increasing and decreasing speed ratio control circuits.

20. In a transmission control system for an engine driven vehicle, the combination comprising ratio changing means for conditioning the transmission for changes in speed ratio, a power relay for operating the ratio changing means, generating means for developing a signal voltage corresponding to vehicle speed, increasing and decreasing speed ratio control circuits connected to the signal voltage generating means, one of the speed ratio circuits including means for varying the signal voltage with changes in engine torque load, a supply of voltage, and a relay control circuit including a switching relay, a semi-conductor power device for controlling the energization of the switching relay from the supply of voltage, a semi-conductor drive device responsive to changes in the signal voltage for controlling the power device, a bias resistor for the input of the drive device, switching contacts arranged to be operated by the switching relay for alternately connecting one of the speed ratio control circuits to the drive device, means for isolating the signal voltage to the drive device from the supply of voltage, and a voltage regulating means disposed between the power device and the supply of voltage so as to supply a relatively constant voltage thereto, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

21. In a transmission control system for a throttle controlled engine driven vehicle, the combination comprising ratio changing means for conditioning the transmission for changes in speed ratio, a power relay for operating the ratio changing means, a generator constructed to be driven at a speed proportional to that of the vehicle so as to develop a signal voltage representative thereof, increasing and decreasing speed ratio control circuits connected to the generator, one of the speed ratio control circuits including a throttle connected variable resistor for varying the signal voltage with changes in throttle position so as to decrease the signal voltage with an increase in throttle opening, a supply of voltage, and a relay control circuit arranged to be alternately connectible with one of the speed ratio control circuits, the relay control circuit including a swiching relay, a power device for controlling the energization of the switching relay from the supply of voltage, and a drive device responsive to changes in the signal voltage for controlling the power device, the power and drive devices each having emitter, collector, and control electrodes, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

22. In a transmission control system for a throttle controlled engine driven vehicle, the combination comprising ratio changing means for conditioning the transmission for changes in speed ratio, a power relay for operating the ratio changing means, a generator constructed to be driven at a speed proportional to that of the vehicle so as to develop a signal voltage representative thereof, increasing and decreasing speed ratio control circuits connected to the generator, one of the speed ratio circuits including a throttle connected variable resistor for varying the signal voltage with changes in throttle position so as to decrease the signal voltage with an increase in throttle opening, a supply of voltage, a relay control circuit including a switching relay, a power device for controlling the energization of the switching relay from the supply of voltage, a drive device responsive to changes in the signal voltage for controlling the power device, the power and drive devices each having emitter, collector, and control electrodes, and switching contacts arranged to be operated by the switching relay for alternately connecting one of the speed ratio control circuits to the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

23. In a transmission control system for a throttle controlled engine driven vehicle, the combination comprising ratio changing means for conditioning the transmission for changes in speed ratio, a power relay for operating the ratio changing means, a generator constructed to be driven at a speed proportional to that of the vehicle so as to develop a signal voltage representative thereof, increasing and decreasing speed ratio control circuits connected to the generator, one of the speed ratio circuits including a throttle connected variable resistor for varying the signal voltage with changes in throttle position so as to decrease the signal voltage with an increase in the throttle opening, a supply of voltage, and a relay control circuit including a switching relay, a power device for controlling the energization of the switching relay from the supply of voltage, a drive device responsive to changes in the signal voltage for controlling the power device, the power and drive devices each having emitter, collector, and control electrodes, switching contacts arranged to be operated by the switching relay for alternately connecting one of the speed ratio control circuits to the drive device, and a bias resistor for the input of the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

24. In a transmission control system for a vehicle propelled by an engine having an intake manifold, the combination comprising ratio changing means for conditioning the transmission for changes in speed ratio, a power relay for operating the ratio changing means, a generator constructed to be driven at a speed proportional to that of the vehicle so as to develop a signal voltage representative thereof, increasing and decreasing speed ratio control circuits connected to the generator, one of the speed ratio circuits including a variable resistor operated by the pressure in the engine intake manifold for varying the signal voltage with changes therein so as to decrease the signal voltage with an increase in manifold pressure, a supply of voltage, and a relay control circuit including a switching relay, a power device for controlling the energization of the switching relay from the supply of voltage, a drive device responsive to changes in the signal voltage for controlling the power device, the power and drive devices each having emitter, collector, and control electrodes, switching contacts arranged to be operated by the switching relay for alternately connecting one of the speed ratio control circuits to the drive device, a bias resistor for the input of the drive device, and means for isolating the signal voltage to the drive device from the supply of voltage, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

25. In a transmission control system for a throttle controlled engine driven vehicle, the combination comprising ratio changing means for conditioning the transmission for changes in speed ratio, a power relay for operating the ratio changing means, a generator constructed to be driven at a speed proportional to that of the vehicle so as to develop a signal voltage representative thereof, increasing and decreasing speed ratio control circuits connected to the generator, one of the speed ratio circuits including a throttle connected variable resistor for varying the signal voltage with changes in throttle position so as to decrease the signal voltage with an increase in the throttle opening, a supply of voltage, and a relay control circuit including a switching relay, a power device for controlling the energization of the switching relay from the supply of voltage, a voltage regulator disposed between the power device and the supply of voltage so as to supply a relatively constant voltage thereto, a drive device responsive to changes in the signal voltage for controlling the power device, the power and drive devices each having emitter, collector, and control electrodes, switching contacts arranged to be operated by the switching relay for alternately connecting one of the speed ratio control circuits to the drive device, a bias resistor for the input of the drive device, and means for isolating the signal voltage to the drive device from the supply of voltage, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

26. In a transmission control system for a throttle controlled engine driven vehicle, the combination comprising ratio changing means for conditioning the transmission for changes in speed ratio, a power relay for operating the ratio changing means, a generator constructed to be driven at a speed proportional to that of the vehicle so as to develop a signal voltage representative thereof, increasing and decreasing speed ratio control circuits connected to the generator, one of the speed ratio circuits including a throttle connected variable resistor for varying the signal voltage with changes in throttle position so as to decrease the signal voltage with an increase in throttle opening, a supply of voltage, and a relay control circuit including a switching relay, a power device for controlling the energization of the switching relay from the supply of voltage, a voltage regulator disposed between the power device and the supply of voltage so as to supply a relatively constant voltage thereto, a drive device responsive to changes in the signal voltage for controlling the power device, the power and drive devices each having emitter, collector, and control electrodes, switching contacts arranged to be operated by the switching relay for alternately connecting one of the speed ratio control circuits to the drive device, a bias resistor for the input of the drive device, means for isolating the signal voltage to the drive device from the supply of voltage, and means in the relay control circuit for compensating for changes in temperature, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

27. In a vehicle transmission for an engine driven vehicle, the combination comprising driving and driven shafts, gearing interposed between the driving and driven shafts, hydraulically operated ratio changing mechanism for so conditioning the gearing as to provide a plurality of speed ratios therethrough; a source of pressure fluid; a shift valve train for supplying pressure fluid from the source to the ratio changing mechanism, a power relay for operating the shift valve train, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the control means including means for varying the signal voltage with changes in engine torque load, a supply of voltage, and a relay control circuit arranged to be alternately connectible with one of the signal voltage modifying means so as to control the energization of the power relay from the supply of voltage and thereby cause the ratio changing means to condition the transmission for increasing and decreasing speed ratios in accordance with changes in the signal voltage produced, respectively, by increasing and decreasing speed ratio signal voltage modifying means.

28. In a vehicle transmission for an engine driven vehicle, the combination comprising driving and driven shafts, gearing interposed between the driving and driven shafts, hydraulically operated ratio changing mechanism for so conditioning the gearing as to provide a plurality of speed ratios therethrough, a source of pressure fluid; a shift valve train for supplying pressure fluid from the source to the ratio changing mechanism, a power relay for operating the shift valve train, generating means for developing a signal voltage corresponding to vehicle speed, signal voltage modifying means including upshift control means altering the signal voltage according to one scheme when the speed ratios are increasing so that upshifts occur at predetermined points and downshift control means altering the signal voltage according to another scheme when the speed ratios are decreasing so that downshifts occur at different predetermined points, one of the control means including means for varying the signal voltage with changes in engine torque load, a supply of voltage, and a relay control circuit arranged to be alternately connectible with one of the signal voltage modifying means, the relay control circuit including a switching relay responsive to changes in the signal voltage for controlling the energization of the switching relay from the supply so as to cause the ratio changing means to condition the transmission for increasing and decreasing speed ratios in accordance with changes in the signal voltage produced, respectively, by the increasing and decreasing speed ratio signal voltage modifying means.

29. In a vehicle transmission for an engine driven vehicle, the combination comprising driving and driven shafts, gearing interposed between the driving and driven shafts, hydraulically operated ratio changing mechanism for so conditioning the gearing as to provide a plurality of speed ratios therethrough, a source of pressure fluid, a shift valve train for supplying pressure fluid from the source to the ratio changing mechanism, a power relay for operating the shift valve train, generating means for developing a signal voltage corresponding to vehicle speed, signal voltage modifying means including upshift control means altering the signal voltage according to one scheme when the speed ratios are increasing so that upshifts occur at predetermined points and downshift means altering the signal voltage according to another scheme when the speed ratios are decreasing so that downshifts occur at different predetermined points, one of the control means including means for varying the signal voltage with changes in engine torque load, a supply of voltage, and a relay control circuit arranged to be alternately connectible with one of the signal voltage modifying means, the relay control circuit including a switching relay, a power device for controlling the energization of the switching relay from the supply of voltage, and a drive device responsive to changes in the signal voltage for controlling the power device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio signal voltage modifying means.

30. In a vehicle transmission for a throttle controlled engine driven vehicle, the combination comprising driving and driven shafts, gearing interposed between the driving and driven shafts, hydraulically operated ratio changing mechanism for so conditioning the gearing as to provide a plurality of speed ratios therethrough, a source of pressure fluid, a shift valve train for supplying pressure fluid from the source to the ratio changing mechanism, a power relay for operating the shift valve train, generating means for developing a signal voltage correspondings to vehicle speed, increasing and decreasing speed ratio control circuits connected to the signal voltage generating means, one of the speed ratio circuits including means for varying the signal voltage with changes in throttle position, a supply of voltage, and a relay control circuit including a switching relay, a semi-conductor power device for controlling the energization of the switching relay from the supply of voltage, a semi-conductor drive device responsive to changes in the signal voltage for controlling the power device, switching contacts arranged to be operated by the switching relay for alternately connecting one of the speed ratio control circuits to the drive device, and a bias resistor for the input of the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

31. In a vehicle transmission for a throttle controlled engine driven vehicle, the combination comprising driving and driven shafts, gearing interposed between the driving and driven shafts, hydraulically operated ratio changing mechanism for so conditioning the gearing as to provide a plurality of speed ratios therethrough; a source of pressure fluid, a shift valve train for supplying pressure fluid from the source to the ratio changing mechanism, a power relay for operating the shift valve train, a generator constructed to be driven at a speed proportional to that of the vehicle so as to develop a signal voltage representative thereof, increasing and decreasing speed ratio control circuits connected to the generator, one of the speed ratio circuits including a throttle connected variable resistor for varying the signal voltage with changes in throttle position so as to decrease the signal voltage with an increase in throttle opening, a supply of voltage, and a relay control circuit including a switching relay, a power device for controlling the energization of the switching relay from the supply of voltage, a voltage regulator disposed between the power device and the supply of voltage so as to supply a relatively constant voltage thereto, a drive device responsive to changes in the signal voltage for controlling the power device, the power and drive devices each having emitter, collector, and control electrodes, switching contacts arranged to be operated by the switching relay for alternately connecting one of the speed ratio control circuits to the drive device, a bias resistor for the input of the drive device, means for isolating the signal voltage to the drive device from the supply of voltage, and means in the relay control circuit for compensating for changes in temperature, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

32. In a vehicle transmission for a vehicle propelled by an engine driven vehicle having an intake manifold, the combination comprising driving and driven shafts, gearing interposed between the driving and driven shafts, hydraulically operated ratio changing mechanism for so conditioning the gearing as to provide a plurality of speed ratios therethrough, a source of pressure fluid, a shift valve train for supplying pressure fluid from the source to the ratio changing mechanism, a power relay for operating the shift valve train, generating means for developing a signal voltage corresponding to vehicle speed, increasing and decreasing speed ratio control circuits connected to the signal voltage generating means, one of the speed ratio circuits including a variable resistor operated by the pressure in the engine intake manifold for varying the signal voltage with changes therein so as to decrease the signal voltage with an increase in manifold pressure, a supply of voltage, and a relay control circuit including a switching relay, a semi-conductor power device for controlling the energization of the switching relay from the supply of voltage, a semi-conductor drive device responsive to changes in the signal voltage for controlling the power device, switching contacts arranged to be operated by the switching relay for alternately connecting one of the speed ratio control circuits to the drive device, and a bias resistor for the input of the drive device, the switching relay controlling the energization of the power relay from the supply voltage so as to cause the ratio changing means to condition the transmission for increasing and decreasing speed ratios in accordance with changes in the signal voltage produced, respectively, by the increasing and decreasing speed ratio control circuits.

33. In a transmission control system for a vehicle, the combination comprising ratio changing means for conditioning the transmission for different speed ratios, operating means for the ratio changing means, generating means for developing a signal voltage corresponding to vehicle speed, signal voltage modifying means arranged so as to modify the signal voltage, the signal voltage modifying means including upshift control means modifying the signal voltage according to one scheme when the speed ratios are increasing so that upshifts occur at predetermined points and down shift control means modifying the signal voltage according to another scheme when the speed ratios are decreasing so that downshifts occur at different predetermined points, and circuit means coacting with the signal voltage modifying means and the generating means so as to produce a control voltage for controlling the operating means and thereby cause the ratio changing means to condition the transmission for both increasing and decreasing speed ratios in accordance with changes in the signal voltage produced by the signal voltage modifying means.

34. In a transmission control system, the combination of switch means responsive to a voltage signal indicative of the required ratio for the transmission, and ratio changing means for varying the drive through the transmission, the switch means being operatively interconnected with the ratio changing means so as to vary the ratio in response to the voltage signal, the switch means including upshift control means operative to cause the ratio changing means to vary the ratio according to one scheme when the ratio is increasing so that upshifts occur at predetermined points and downshift control means operative to cause the ratio changing means to vary the ratio according to another scheme when the ratio is decreasing so that downshifts occur at different predetermined points.

35. In a transmission control system for an engine driven vehicle, the combination of electrical means for developing at least one infinitely variable electrical effect that is a function of the operating conditions of the engine and the vehicle and is indicative of the required ratio for the transmission, ratio changing means for varying the drive ratio through the transmission, and switch means operatively connected with the electrical means and the ratio changing means, the switch means including upshift control means effective in response to the electrical effect to cause the drive ratio of the transmission to be increased according to one scheme so that upshifts occur at predetermined points and downshift control means effective also in response to the electrical effect to cause the drive ratio to be decreased according to another scheme so that downshifts occur at different predetermined points.

36. In a transmission control system for an engine driven vehicle, the combination of means for developing at least one electrical effect that is indicative of an operating condition of the engine and at least one other electrical effect that is indicative of an operating condition of the vehicle, ratio changing means for varying the ratio of the transmission, and switch means responsive to the electrical effects for actuating the ratio changing means, the switch means including upshift control means causing the ratio changing means to be actuated according to one scheme when the ratio is increasing so that upshifts occur at predetermined points and downshift control means causing the ratio changing means to be actuated according to another scheme when the ratio is decreasing so that downshifts occur at different predetermined points.

References Cited in the file of this patent

UNITED STATES PATENTS

| | | |
|---|---|---|
| 2,839,944 | Von Rucker | June 24, 1958 |
| 2,910,884 | Peras | Nov. 3, 1959 |
| 2,913,918 | Gill | Nov. 24, 1959 |
| 2,929,256 | Peras | Mar. 22, 1960 |
| 2,932,211 | Vernhes | Apr. 12, 1960 |

UNITED STATES PATENT OFFICE
CERTIFICATE OF CORRECTION

Patent No. 3,068,715                  December 18, 1962

John B. Brennan et al.

It is hereby certified that error appears in the above numbered patent requiring correction and that the said Letters Patent should read as corrected below.

Column 14, line 51, for "is" read -- in --; line 69, for "to" read -- of --; column 18, line 39, after "supply" insert -- voltage --.

Signed and sealed this 27th day of August 1963.

(SEAL)
Attest:

ERNEST W. SWIDER                  DAVID L. LADD
Attesting Officer                 Commissioner of Patents